A. WENDEL.
HAY LOADER.
APPLICATION FILED AUG. 3, 1920.

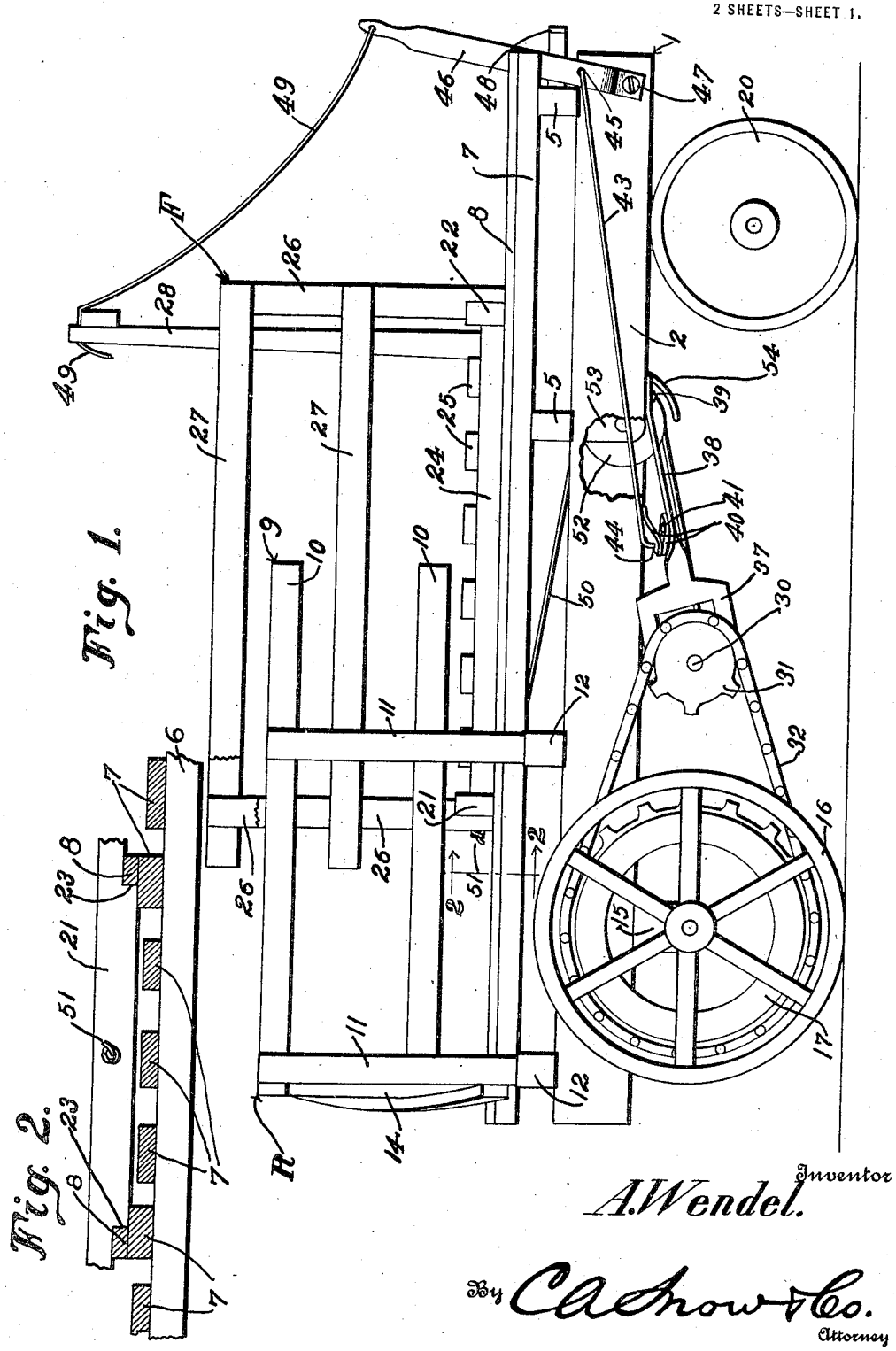

1,418,997.

Patented June 6, 1922.
2 SHEETS—SHEET 2.

Fig. 3

Inventor
A. Wendel.
By C.A.Snow & Co.
Attorney

UNITED STATES PATENT OFFICE.

ADOLPH WENDEL, OF SPENCER, WISCONSIN.

HAY LOADER.

1,418,997.  Specification of Letters Patent.  Patented June 6, 1922.

Application filed August 3, 1920. Serial No. 400,909.

*To all whom it may concern:*

Be it known that I, ADOLPH WENDEL, a citizen of the United States, residing at Spencer, in the county of Marathon and State of Wisconsin, have invented a new and useful Hay Loader, of which the following is a specification.

The device forming the subject matter of this application is a hay wagon, and the invention aims to provide novel means whereby, when a quantity of hay or other material is deposited in a rack on the wagon body, the forward portion of the rack may be moved forwardly, bearing the hay or other material with it, and leaving a space at the rear of the hay and the forward portion of the rack.

The invention aims to provide novel means under the control of an operator whereby the forward portion of the rack may be advanced by the action of the ground wheel of the vehicle, the construction being such that when the forward portion of the rack has moved forward to a predetermined point, further movement will be stopped automatically.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows, in side elevation, a device constructed in accordance with the invention; Figure 2 is a fragmental section taken approximately on the line 2—2 of Figure 1; and Figure 3 is a plan view of the under side of the device.

The device comprises a wagon body 1 which may be variously constructed. The body 1 may include longitudinal sills 2 connected adjacent to their ends by a head piece 3 and a tail piece 4. Cross beams 5 and 6 are superposed on and secured to the sills 2. Longitudinal bottom slats 7 are attached to the cross beams 5 and 6. Certain of the slats 7 are provided, as shown in Figure 2, with upstanding tracks 8.

A rear rack section denoted by the letter R is fixed to the rear portion of the wagon body 1 and includes sides 9 made up of horizontal strips 10 secured to posts 11, the lower ends of the posts being seated in sockets 12 mounted on the ends of the cross beams 6. The rear end of the rear rack section R is formed by crossed braces 14 connecting the rearmost posts 11. The forward end of the rear rack section R is open.

A rear axle 15 is connected to the sills 2, ground wheels 16 being journaled on the axle 15. A sprocket wheel 17 is connected to one ground wheel 16 to rotate therewith. A forward axle 18 is connected as indicated at 19, for horizontal swinging movement, to the wagon body 1 and carries forward ground wheels 20.

The device includes a front rack section denoted by F, the front rack section having a bottom including a rear end bar 21 and a forward end bar 22, the bars 21 and 22 being provided with recesses 23 (Figure 2) receiving the tracks 8, the bars 21 and 22 being slidably supported on the bottom slats 7 which are provided with the tracks 8. The bars 21 and 22 are connected by longitudinal beams 24, the beams 24 being united by cross slats 25. Posts 26 upstand from the ends of the bars 21 and 22 and are connected by side slats 27. The side slats 27 of the front rack section F slide in contact with the posts 11, the strips 10 of the rear rack section R being in slidable contact with the rear posts 26. The side slats 27 of the front rack section F are connected by a front wall 28, the said front rack section being open at its rear end.

Bearings 29 are mounted on the lower edges of the longitudinal sills 2, and in the bearings 29, a transverse shaft 30 is journaled for rotation. A sprocket wheel 31 is loose on one end of the shaft 30. A sprocket chain 32 forms a driving connection between the sprocket wheel 17 and the sprocket wheel 31. The sprocket wheel 31 is provided with a clutch member 33 adapted to coact with a clutch member 34 secured to the shaft 30. A set collar 35 is attached to the shaft 30, and between the set collar 3 and the clutch member 34, one of the bearings 29 is located, the shaft 30 thus being held against longitudinal movement in the bearings 29. The clutch member 33 is provided with a circumscribing groove 36 receiving a fork 37 and an angular lever 38 fulcrumed at 39 on one of the longitudinal sills 2. The numeral 40 marks a pair of toggle links, one link being pivoted at its outer end, as indicated at 41 to the lever 38, and the other link being pivoted, at its outer end, as indicated at 42, to one of the longitudinal sills 2. The numeral 43 designates a forwardly extended operating member, preferably in the form of a rod. The rear end of the member 43 forms a pivotal connection between the toggle links 40 as designated at 44. The forward end of the rod 43 is pivoted at 45 to a vertically swinging lever 46 fulcrumed at 47 on the forward end of one of the longitudinal sills 2. The lever 46 operates within an angular guard 48 carried by one of the cross beams 5. A flexible element 49 is secured to the upper end of the lever 46 and is of sufficient length so that it can be manipulated conveniently by a person standing on a load in the wagon.

A flexible element 50 is provided, the rear end of the flexible element being secured as indicated at 51, to the rear end bar 21 of the front rack section F. Thence, the flexible element 50 is extended forwardly around a sheave 52 journaled on a bracket 53 mounted on one of the cross beams 5, the sheave 52 being shielded by a curved guard 54 forming a part of the bracket 53. From the sheave 52, the flexible element 50 is extended rearwardly and is wound as is indicated at 55 around the shaft 30.

In practical operation, the lever 46 is manipulated and, through the instrumentality of the operating member 43, the toggle links 40 are actuated to swing the lever 38 on its fulcrum 39 and to move the clutch member 33 out of engagement with the clutch member 34. When the parts are arranged as above described, no rotary movement will be transmitted to the shaft 30 from the sprocket wheel 31, the sprocket chain 32 and the sprocket wheel 17. The front rack section F is drawn rearwardly until the front wall 28 of the said section is disposed closely adjacent to the forward ends of the strips 10 which form a part of the rear rack section R. The hay or other material can now be dumped into the rack made up of the sections R and F, and accumulate to any desired height, in the rack, the hay or other material being supported on the bottom slats 25 which constitute a part of the front rack section F. When a sufficient amount of hay or other material has accumulated in the front rack section F, then a person standing on top of the load, pulls on the flexible element 49, the lever 46 being operated, and the member 43 transmitting motion to the toggle links 40, the lever 38 being swung on its fulcrum 39, and the clutch member 33 being brought into engagement with the clutch member 34. Thus, there is established a driving train comprising the ground wheel 16, the sprocket wheel 17, the sprocket chain 32, the sprocket wheel 31, the clutch member 33, the clutch member 34 and the clutch member 29, rotation being imparted to the shaft 30. When the shaft 30 is rotated, the flexible element 50 will be wound on the shaft. The flexible element travels around the sheave 52 and advances the forward rack section R, the load being carried forward accordingly and space being created, at the rear of the load, in the rear rack section R. When the front rack section F advances sufficiently, the said section engages the lever 46 from which motion is transmitted to the clutch member 33 and the clutch member 33 is moved out of engagement with the clutch member 34, the forward sliding movement of the front section F of the rack thus being stopped automatically.

The device is so constructed that a large amount of pitching from the rear end of the rack toward the forward end of the rack may be avoided, and, as a matter of practice, one man on the load may be dispensed with.

Having thus described the invention, what is claimed is:—

1. In a device of the class described, a vehicle frame; a wheel on the frame, and rotated by contact with the ground; a rear rack section fixed to the frame; a front rack section slidable on the frame; an operative connection between the ground wheel and the front rack section for advancing the front rack section when the ground wheel is rotated; a clutch interposed in said operative connection; and mechanism for actuating the clutch, said mechanism comprising a lever directly under the control of an operator and located in the path of the front rack section, whereby when the front rack section has been advanced to a predetermined point and into direct engagement with said lever, a forward movement of the front rack section will be stopped automatically.

2. In a device of the class described, a vehicle frame; a wheel on the frame and rotated by contact with the ground; a rear rack section fixed to the frame; a front rack section slidable on the frame; a shaft journaled on the frame; means for rotating the shaft from the said wheel; a clutch interposed in said means; a lever fulcrumed on the frame and operatively connected with the clutch; toggle links pivoted, respectively, to the lever and to the frame; a second lever fulcrumed on the frame and lying in the path of the front rack section when the front rack section is advanced; a connection between the last specified lever and the toggle links; and a flexible element connecting the shaft with the front rack section.

In testimony that I claim the foregoing as my own, I have hereto affixed my signature in the presence of two witnesses.

ADOLPH WENDEL.

Witnesses:
A. J. McILHATTAN,
GERTRUDE KLEMM.